Patented Mar. 2, 1937

2,072,639

UNITED STATES PATENT OFFICE 2,072,639

BLEACHING SUGAR

Hans O. Kauffmann, Buffalo, N. Y., assignor to Buffalo Electro-Chemical Company, Inc., Buffalo, N. Y.

No Drawing. Application July 2, 1934, Serial No. 733,531

4 Claims. (Cl. 127—48)

This invention relates to a method of preventing caramel formation when refining sugar syrups and solutions made from washed raw sugar, and more particularly to a method of producing white, well grained granulated sugar from solutions of affinated raw sugar by treating the same with hydrogen peroxide to prevent darkening of the color of the boiled syrup.

Sugar has been refined heretofore by crystallizing raw sugar from sugar juices extracted from sugar cane, sugar beets and other sacchariferous materials, washing or affinating the raw sugar, melting this sugar, that is, preparing a water solution of sugar of high sugar content, and thereafter defecating the solution, filtering, and passing the same through bone char filters. It has also been proposed to refine sugar by melting the affinated sugars in the usual fashion, defecating and treating with activated carbon, thus eliminating the costly plant investment required in bone char operations.

In accordance with the procedures of the present invention, raw sugar is affinated or washed in the usual way to a purity of about 98.8 to 99 or better the melt defecated and the hydrogen ion concentration, that is the pH of the solution, adjusted to a figure above 7, hydrogen peroxide added prior to boiling and the solution sent to the vacuum pans where it is boiled and grained to produce granulated sugar.

In the usual boiling operations a progressive increase in color of the syrup is noticed. However, where the solution contains hydrogen peroxide the color remains good, does not darken due to caramel formation and portions of the peroxide originally introduced remain in the subsequent boils and aid in maintaining their good color.

To more fully understand the invention, the various operations may best be considered in the light of the following theoretical explanation, which is to be deemed explanatory only rather than a statement of procedure. Thus, in carrying out the refining of washed sugar in accordance with the present invention, the washed sugar of a purity in the neighborhood of 99, is melted with water in the usual way at temperatures of about 180 degrees F. to produce a solution of high sugar content, the sugar content being indicated by a Brix of about 65. The hot solution is thereafter treated with lime and phosphoric acid or other equivalent phosphate capable of precipitating the added lime, in amounts capable of reacting to form a salt precipitating substantially all the calcium and phosphate ions, or defecated in any other suitable fashion. Thereafter sufficient excess lime is added to the solution to raise the pH above that normally desired in a defecated sugar solution. In carrying out the present process, it has been found advantageous to produce a pH of above 7.5 and usually of from 8 to 9.

At this stage of the refining operation, and usually prior to filtering the precipitate formed in the defecation, hydrogen peroxide is added in an amount sufficient to produce a desirable bleaching action. This quantity of hydrogen peroxide will vary, depending upon the previous history of the sugar, but will, in general, amount to approximately 0.25% of the weight of the total solids, that is, sugar, in the syrup. It is believed that when the hydrogen peroxide is added to the syrup in the presence of the precipitate formed during the defecation, and at a pH in the neighborhood of about 8, pectins, waxes, gums, organic coloring matters such as chlorophyll or other colloid coloring matters, are absorbed upon the finely divided precipitate of calcium phosphate and a substantial proportion removed, or these substances are initially acted upon by the hydrogen peroxide to change them to a form where they are readily removable with the precipitate.

The filtered solution will possess a color on the yellow side of white and a substantial proportion of the added hydrogen peroxide will be found present undecomposed in the filtered defecated solution.

The hot filtered sugar solution is thereafter run to the vacuum pans for evaporation and subsequent graining. It is believed that during the evaporation in the vacuum pan, which operation is effected under a vacuum, normally in the neighborhood of about 28 inches of water, giving a boiling point to the solution of somewhere in the neighborhood of 60° the hydrogen peroxide remains in the sugar solution being concentrated at substantially the same rate as the sugar solution and in fact probably being stabilized to some extent by the presence of invert sugars, such as glucose. During the boiling in the vacuum pan the pH of the solution drops to a slight extent, probably due to the formation of oxidation products, either of the sugar or of the non-sucrose materials present.

During the boiling a substantial portion of the water of the syrup is driven off the solution becoming more and more concentrated in sugar and hydrogen peroxide. The color of the solution is not markedly darker at the termination of the first and of subsequent boils than at the start of this operation probably due to the fact that substantially no caramel is formed in the presence of hydrogen peroxide at this high temperature or if formed is oxidized to colorless substances and a smaller quantity of final molasses results in the processes used heretofore.

After the first boil the solution contains hydrogen peroxide which may be tested for in the usual fashion, this hydrogen peroxide remaining in the liquor even after subsequent boils, decreasing, however, in amount, and a small amount of hydrogen peroxide is found in the distillate which is used for the preparation of subsequent melts. The sugar crystals, however, are free of hydrogen peroxide.

Although the preferable mode of operation is in a solution of a pH higher than 7, the operation can be performed in acid solutions particularly where inversion of sucrose is not objectionable, as in the preparation of sugar syrups for the confectionary trade.

It will be understood that in practicing the invention, substances liberating hydrogen peroxide in water may be substituted for hydrogen peroxide mentioned in the specific examples herein above, without departing from the spirit and scope of this invention since the metallic peroxides, as for instance sodium peroxide may be used to give the beneficial effects produced with hydrogen peroxide, as may the per salts such as the persulfates, persilicates, perborates and the like.

It will be seen that this method of sugar refining affords a rapid and economical refining procedure since it is unnecessary to pass the solution through bone char or to treat the same with expensive activated carbon with attendant troublesome filtering problems. Further, economies are effected due to the decrease in amount of uncrystallizable material appearing as the final molasses residue. Substantially no increase in the ash content of the sugar is observed and the sugar possesses no objectionable taste or odor.

What is claimed is:

1. The method of refining sugar which comprises adding to a syrup of washed sugar, lime and an amount of a soluble phosphate removing substantially all ash forming material introduced into the syrup by forming a salt substantially insoluble in the syrup, adjusting the pH of the solution to a figure greater than 7, substantially immediately thereafter adding hydrogen peroxide to the solution to decolorize a portion of the objectionable coloring materials therein and concentrating the syrup.

2. The method of refining sugar which comprises adding to a syrup of washed sugar, lime and an amount of soluble phosphate removing substantially all ash forming material introduced into the syrup, adjusting the pH of the solution to a figure greater than 7, substantially immediately thereafter adding hydrogen peroxide to the solution to decolorize a portion of the objectionable coloring materials therein and, thereafter crystallizing the sugar from the syrup.

3. The method of decolorizing sugar syrups made from affinated sugar which comprises treating the syrup with a defecant of lime and a soluble phosphate at a pH greater than 7 producing a precipitate in the syrup, substantially immediately adding $H_2O_2$ thereto and while the precipitate is in suspension throughout the syrup, and thereafter filtering the syrup.

4. The method of decolorizing sugar syrups made from affinated sugar which comprises treating the syrup with a defecant of lime and a soluble phosphate at a pH greater than 7 producing a precipitate in the syrup, substantially immediately adding $H_2O_2$ thereto and while the precipitate is in suspension throughout the syrup, filtering the syrup and crystallizing sugar therefrom.

HANS O. KAUFFMANN.